United States Patent [19]

Dunbar et al.

[11] Patent Number: 5,346,065
[45] Date of Patent: Sep. 13, 1994

[54] MEDIA SHIPPING CONTAINER

[75] Inventors: William M. Dunbar, Cottage Grove, Minn.; Harold B. Stinson, Weatherford, Okla.

[73] Assignee: Minnesota Mining and Manufacturing Company, St. Paul, Minn.

[21] Appl. No.: 16,780

[22] Filed: Feb. 11, 1993

[51] Int. Cl.$^5$ ............................................. B65D 85/30
[52] U.S. Cl. .................... 206/444; 206/391; 206/408; 206/303
[58] Field of Search ............... 206/303, 391, 392, 394, 206/408, 413, 415, 416, 444

[56] References Cited

U.S. PATENT DOCUMENTS

| | | | |
|---|---|---|---|
| 2,718,303 | 9/1955 | Polglase | 206/394 |
| 2,974,781 | 3/1961 | Zimmerman | 206/303 |
| 3,612,233 | 10/1971 | Nagpal | 206/408 |
| 4,069,914 | 1/1978 | Damsky | 206/303 |
| 4,124,173 | 11/1978 | Damour | 242/72 B |
| 4,208,117 | 6/1980 | Harvey | 206/444 |
| 4,434,891 | 3/1984 | Skinner et al. | 206/444 |
| 4,491,222 | 1/1985 | Gaccetta et al. | 206/394 |
| 4,516,786 | 5/1985 | Lund | 279/2 R |
| 4,577,756 | 3/1986 | Hennessy et al. | 206/444 |
| 4,708,246 | 11/1987 | Minion | 206/394 |
| 4,723,655 | 2/1988 | Schreiber | 206/391 |
| 4,730,779 | 3/1988 | Thievessen | 242/72 R |
| 4,752,007 | 6/1988 | Rossi et al. | 206/444 |
| 4,779,724 | 10/1988 | Benz et al. | 206/303 |
| 4,792,044 | 12/1988 | Nishizawa et al. | 206/394 |
| 4,883,178 | 11/1989 | Thiele et al. | 206/391 |
| 4,893,765 | 1/1990 | Randolph | 242/72 R |
| 4,955,471 | 9/1990 | Hirose et al. | 206/303 |
| 5,094,346 | 3/1992 | Sommerfeldt et al. | 206/394 |

FOREIGN PATENT DOCUMENTS

| | | | |
|---|---|---|---|
| 484399 | 6/1952 | Canada | 206/392 |
| 41188 | 10/1965 | Fed. Rep. of Germany | 206/392 |
| 2446788 | 4/1976 | Fed. Rep. of Germany | 206/391 |
| 1297833 | 11/1972 | United Kingdom | 206/392 |

Primary Examiner—David T. Fidei
Attorney, Agent, or Firm—Gary L. Griswold; Walter N. Kirn; Eric D. Levinson

[57] ABSTRACT

A container is used to hold and transport punched diskette media to prevent contamination of and damage to the media. The container includes an outer shell comprising a cover and a base formed of a durable, preformed material. The base has an inner surface having at least one protruding male structure suitable for receiving and mounting a first hollow portion of a spindle. The cover has a second inner surface having a recessed female structure suitable for receiving another portion of a spindle. In addition, a spindle mounting member designed to carry a plurality of punched diskette media is included in the container. The spindle mounting member is an elongate spindle with a hollowed end for placement on the protruding male structure in the base and an end suitable for placement within the recessed female structure in the cover. The spindle mounting member includes a circumferential or annular media holder suitable for supporting media placed on the spindle. A closure member securely closes the container. A handle is provided for carrying the container in a position which places the spindle in a horizontal plane so that the weight of the media is on the spindle during shipment.

8 Claims, 5 Drawing Sheets

MEDIA SHIPPING CONTAINER

FIELD OF THE INVENTION

The invention relates to shipping containers used to transport magnetic media. More specifically, a container holds and transports punched diskette media in a horizontal orientation to prevent damage to the media and to keep the media free of contamination.

BACKGROUND OF THE INVENTION

Large rolls of a magnetic media material, or webs, are mass punched to form diskette punched magnetic media which are commonly used in the computer industry. The magnetic media is punched in a circular shape, with a circular center piece also punched out. These disk media, commonly known as cookies in the industry, are then stacked for transport one on top of the other.

As the media corner of the punch press, they are stacked into round plastic containers or canisters. After the canisters are filled with approximately five hundred diskettes in a horizontal orientation, the canister is closed with a cover. A number of plastic canisters are stacked into larger, typically cardboard, shipping containers, and are then shipped to other assembly sites. The larger cardboard shipping containers containing a large number of media canisters are often quite heavy, and may be difficult for some people to pick up. The containers also generally do not have a handle. A significant amount of time is expended loading and unloading the numerous canisters from the shipping container, since each canister contains only about five hundred media. The canisters also do not generally have handles. Use of certain cardboard and plastic shipping containers produces much disposable waste, which adds to environmental problems.

At the assembly site, the cover is pried off of each of the canisters. A worker typically inverts the canister to remove the contents and places the media on a spindle. The worker then takes the media stacked on the spindle to the next processing step, such as burnishing.

There are several disadvantages to having the punched media stacked and shipped horizontally in the shipping containers as described above. The magnetic media material is very sensitive. A pressure applied to the top of the horizontal stack of punched media will cause a defect or debris to be transmitted through numerous layers of the media. This damages the media and may result in significant rejection rates of shipped media. For example, the pressure exerted against the media during shipping and removal of the media from the container may cause a defect to be transmitted to perhaps twenty or thirty of the diskettes in the stack. In addition, when the cover is removed from the plastic shipping container, the downward pressure during removal of the lid may also damage some of the media.

Debris, such as dust, on one of the diskettes may also cause damage when the vertical stacking weight of the media causes the debris to affect the closely packed surrounding media. Media also tends to move during shipping due to vibration, which causes damage to the media from abrasion. Media movement may also generate debris trails in the media surface that result in further defects.

Media are sometimes shipped in a compressed state in a packing arrangement known as a brick. The media are placed on a spindle, plates are positioned on either end of the spindle, and bolts are tightened against the plates to exert pressure on the media to form the brick. The pressure can damage the media, especially if debris is positioned against the media since the debris cannot be dislodged from the compressed media. U.S. Pat. Nos. 4,955,471 and 4,883,178 illustrate this type of packing structure used for magnetic tapes. The brick packing arrangement is heavy because construction plates are bolted together by metal bolts. In addition, these bricks are more difficult, costly, and time consuming to use since the packing arrangement must be bolted together and then loosened when the media are to be used, which requires more labor.

SUMMARY OF THE INVENTION

The invention relates to a container used to hold and transport punched diskette media to prevent contamination of and damage to the media. The container includes an outer shell formed of a durable pre-formed material which has an inner side surface having at least one protruding male structure suitable for receiving and mounting a first hollow portion of a spindle and a second inner surface having a recessed female structure suitable for receiving another portion of a spindle. In addition, a spindle mounting member designed to carry a plurality of punched diskette media is also included in the container. The spindle mounting member is an elongate spindle with a hollowed end for placement on the outer shell protruding male structure and has a second end suitable for placement within the outer shell recessed female structure. The spindle mounting member includes a circumferential or annular media holder suitable for supporting media placed on the spindle. An outer shell closure member securely closes the container. In addition, a preferred embodiment container includes a handle for carrying the container in a position which places the spindle in a horizontal plane so that the weight of the media is on the spindle, rather than on other media, during shipment.

The invention also relates to a method for reducing the weight and pressure on punched diskette media during transport. After the media are punched from a roll of magnetic material, the media are positioned on spindles. The spindles are oriented in a container, and the container is fastened. The container is carried so that the spindles remain in a horizontal orientation during transport, and reduce the pressure and weight effects on the media.

The invention also relates to a container used to hold and transport annular ring shaped sensitive material which prevents damage to the material and protects the material from contamination. The container comprises an outer shell formed of a durable pre-formed material, the outer shell having a first inner side surface and a second inner side surface, with the first and second inner side surfaces having recessed structures suitable for receiving a spindle therein. In addition, the container includes spindle mounting means for carrying a plurality of the ring shaped material, the spindle mounting means comprising an elongate spindle having a first end for placement within the recessed structure and a second end having a circumferential protruding lip for placement in the recessed structure. The container also includes an outer shell closure member which securely closes the container. In addition, the container includes a handle used to carry the container in a position which always places the spindle in a horizontal orientation so that the weight of the sensitive material is on the spindle during shipment.

BRIEF DESCRIPTION OF THE DRAWINGS

FIG. 3 is a detailed perspective view of a spindle.

FIG. 4 is a detailed perspective view of the media holder seen from the top.

FIG. 5 is a detailed perspective view of the media holder seen from the bottom.

FIG. 6 is a sectional view taken along line 6—6 in FIG. 1.

DETAILED DESCRIPTION OF THE INVENTION

The invention relates to a container designed to hold and transport punched diskette media that significantly reduces the damage to or contamination of the media. The magnetic media are placed on spindles which are securely positioned in a horizontal orientation within the container.

Figure 1:
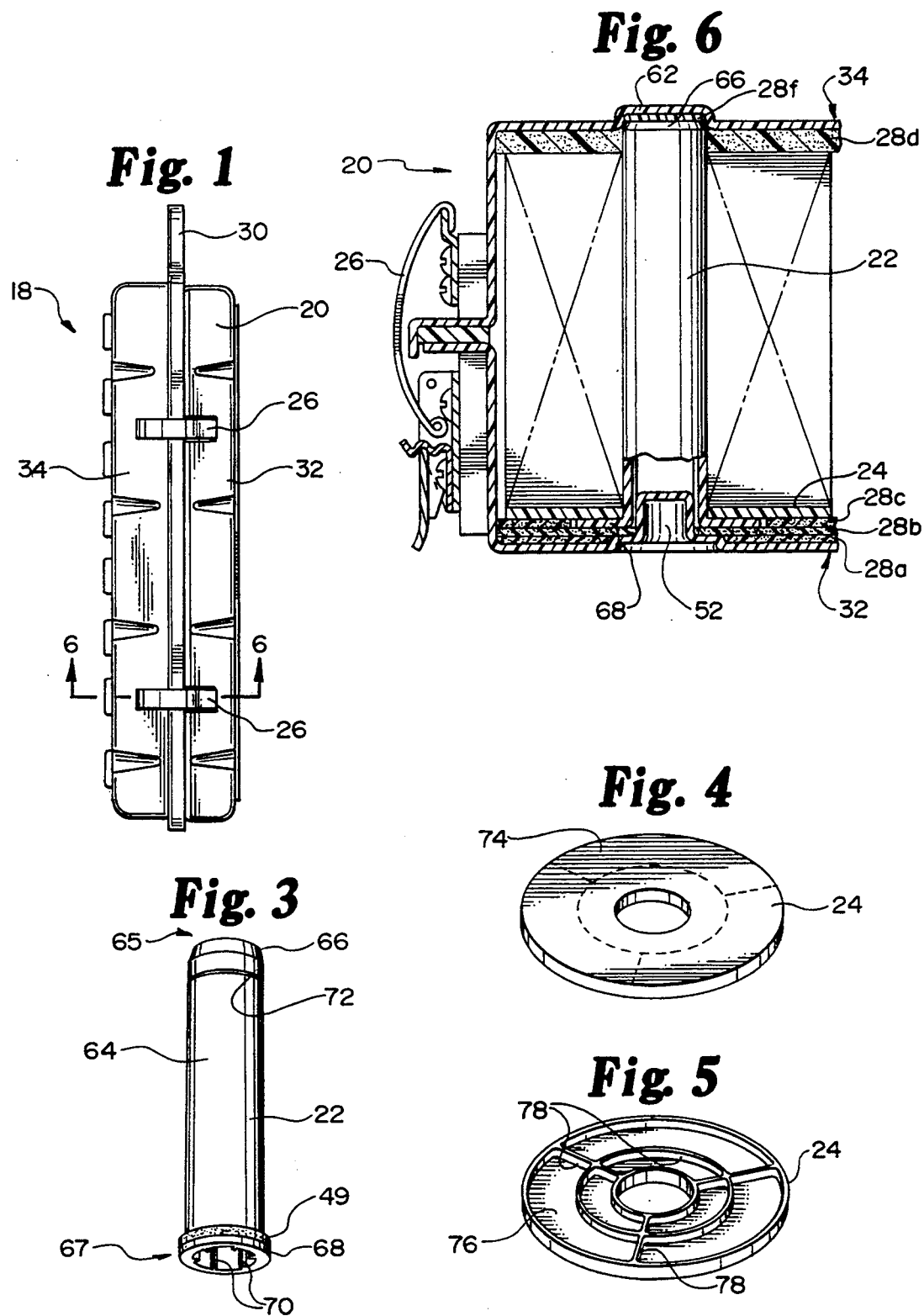
FIG. 1 is a side elevational view of a media shipping container.
Figure 2:
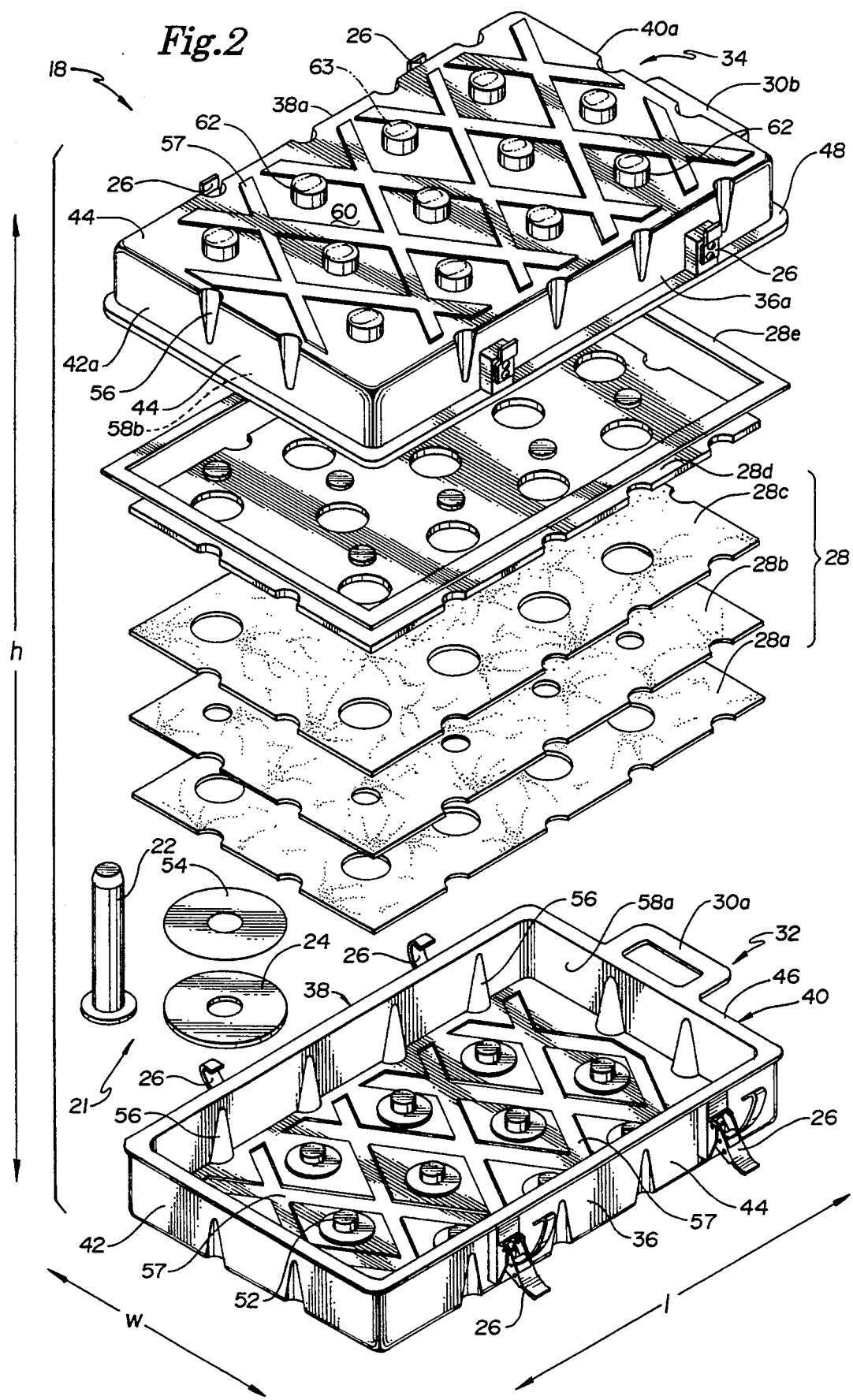
FIG. 2 is an exploded perspective view of the invention.

Referring to FIGS. 1 and 2, shipping assembly 18 of the present invention is shown. Shipping assembly 18 includes outer shell or container 20, spindles 22, media holder 24, latches 26, packing material 28, and handle means 30 comprising handle sections 30a, 30b. Shipping container 20 includes base 32 and cover 34. Base 32 and cover 34 are preferably vacuum formed from a durable, pre-formed high strength material, such as acrylonitrile-butadiene-styrene (ABS). A durable plastic material is preferred so that container 20 is kept lightweight, but other materials may also be utilized. Base 32 and cover 34 are cooperatively positioned on top of one another to close the container, and are securely retained in this position by latches 26 on the outer surface 44 of sides 36, 36a, 38, 38a of container 20. Handle sections 30a, 30b are positioned on sides 40, 40a proximate the edge 46 of base 32 and edge 48 of cover 34 of container 20. Container 20 may contain a registration or alignment structure on the outside surface of container 20 for use in an automated system, and may have an embossed surface. In addition, container 20 may be color coded for identification purposes. Container 20 is manufactured under clean room conditions, and may be repeatedly cleaned prior to subsequent re-uses. Container 20 varies in size, depending on the number of spindle mounting members 21 it contains. As shown in FIG. 2, a container 20 measuring approximately 26.7 centimeters (10.5 inches) in width by approximately 43.2 centimeters (17.0 inches) in length by approximately 12.5 centimeters (5.0 inches) in height is preferred. Container 20 is preferably sized for further treatment processes and shipping in a group of containers 20.

Base 32, configured for stable placement on a flat working surface, such as a table, comprises sides 36, 38, 40, 42 and bottom surface 50. Protruding male structures or spindle mounts 52 protrude from bottom surface 50 of base 32. Base 32 preferably contains up to about twelve spindle mounts 52 if 3.5 inch diameter media 54 are utilized, and up to about six spindle mounts 52 if 5.25 inch media 54 are being shipped. However, the number of spindle mounts 52 and spindles 22 positioned within container 20 may vary depending on the diameter of media 54 used. Spindle mounts 52 are preferably positioned in an alternating pattern within container 20, thereby ensuring close center packing for maximum utilization of all available area in the container. Alternatively, spindle mounts 52 may be recessed so as to extend beyond the outer surface 44 of bottom surface 50 of base 32. Ribs 56 and strengthening members 57 are positioned on the interior surface 58a and the bottom surface 50 of base 32 to optimize the rigidity, strength, and flatness of container 20.

Cover 34 comprises sides 36a, 38a, 40a, 42a and top surface 60. Recessed female structures or spindle holder caps 62 are recessed in top surface 60 of cover 34, extending outwardly beyond the outer surface 44 of top surface 60 of cover 34. Alternatively, spindle holder caps 62 may be configured to protrude into the interior surface 58b of cover 34. Spindle holder caps 62 correspond to and are aligned with spindle mounts 52, to retain spindle 22 securely in position. Spindle holder caps 62 may be marked for identification purposes, such as from which roll of magnetic media the media 54 were obtained. The marking may be done by, for instance, heat embossing a character or marker 63 onto the spindle holder caps 62. Ribs 56 and strengthening members 57 are positioned on the interior surface 58b and top surface 60 of container 20 to maximize rigidity, strength, and flatness of container 20.

Figure 8:
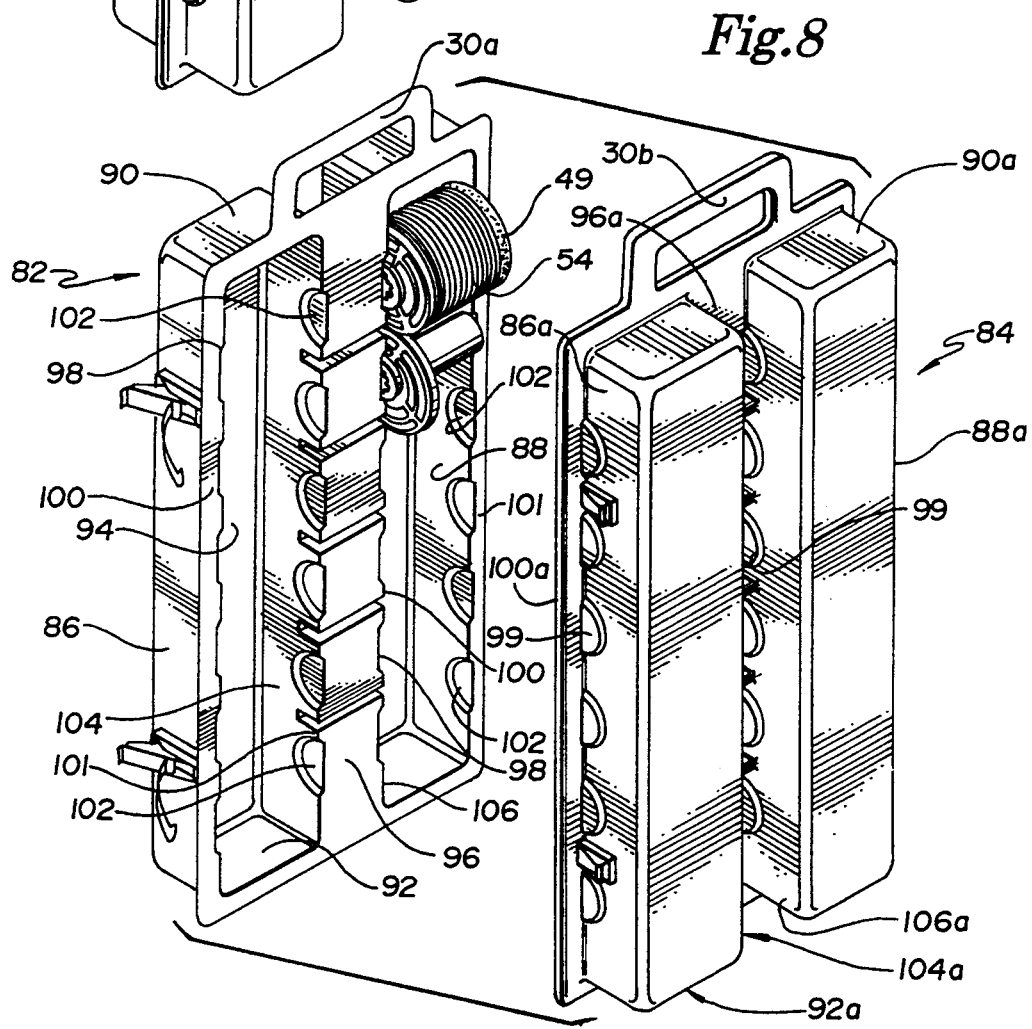
FIG. 8 is an exploded view of an alternate embodiment of the invention.

Referring to FIGS. 3 and 4, spindle mounting members include spindles 22 and media holder 24. Spindles 22 are used to mount and align the punched diskette magnetic media 54, as shown in FIG. 8. Spindles 22 comprise an elongate spindle shaft 64, preferably including chamfered end 66 and circumferential protruding lip 68. Chamfered end 66 may be tapered to different angles, although an angle of fifteen degrees to standard is preferred. Spindles 22 may be configured in different shapes at the ends 65, 67 to fit within various configurations of spindle mounts 52 and spindle holder caps 62. Spindle 22 is generally tubular in shape, and the surface must be free from any imperfections and blemishes. It is preferred that the interior portion of spindle 22 be hollow so that shipping assembly 18 is light weight. Hollow spindle 22 may contain ribs 70 which extend from protruding lip 68 to chamfered end 66 of spindle 22. Spindle 22 has six ribs 70 to strengthen and optimize the rigidity of hollow spindle 22. As shown in FIG. 3, spindles 22 may also have a circumferential notch or groove 72 positioned near chamfered end 66 which is utilized to grip and lift spindle 22. Spindles 22 may vary in size to fit within container 20, but it is preferable to have spindle 22 approximately 10.7 centimeters (4.2 inches) in height by about 3.2 centimeters (1.25 inches) in diameter at the base of protruding lip 68. Spindles 22 are preferably made of a light weight plastic material, such as a high density polyethylene or polypropylene, and are preferably injection molded. Alternatively, spindle 22 may be made of a metallic material, such as aluminum or stainless steel, but the weight and cost of shipping assembly 18 will be increased significantly. Each spindle 22 may be numbered, colored or otherwise marked for processing identification, such as from which roll of magnetic media the media 54 were obtained. The number or marker may be heat embossed onto spindle 22.

Media holder 24 is shown in more detail in FIGS. 4 and 5. Media holder surface 74 is a flat, even surface, to prevent damage to media 54. Bottom surface 76 of media holder 24 may contain strengthening members 78 to optimize rigidity and provide support for media holder 24 on which the punched diskette magnetic media 54 will be positioned. Media holder 24 is generally annular or circular in shape, and may vary in diameter from 8.9 centimeters (3.5 inches) for 3.5 inch media 54, to 13.3 centimeters (5.25 inches) for 5.25 inch media 54. It is preferable to make media holder 24 from a polycarbonate material or plexiglass material. In addition, media holder 24 should preferably be transparent so that it can be utilized with optical sensors. Media holders 24 are also preferably injection molded. A cushioning ring 49 may optionally be positioned between protruding lip 68 on spindle 22 and media holder 24, and may also be positioned on media holder surface 74 for placement between media holder 24 and media 54. Media holder 24 is annularly placed over chamfered end 66, down elongate spindle shaft 64 of spindle 22, and against the top of protruding lip 68 or onto cushioning ring 49, so that bottom surface 76 is adjacent to and faces protruding lip 68 or cushioning ring 49. Media holder 24 serves several important functions. First, media holder 24 retains or holds media 54 when media 54 are aligned on spindle 22. In addition, media holder 24 indexes media 54 for a pick and place type of process as media 54 are pushed up and off spindle 22 during processing. Media holder 24 is also a rigid attenuator of vibrational shock during shipment of container 20.

Referring to FIGS. 2 and 6, container 20 may optionally contain a packing or cushioning material 28 to hold media 54 in place in container 20 and to prevent shifting of media 54 due to vibration transmission during shipment. In one embodiment, foam 28a, 28b, 28c, 28d may be securely positioned within base 32 of container 20 using, for instance, a spot application of a high tack adhesive. Foam 28a, 28b, and 28c is preferably about 0.32 centimeters (0.125 inches) thick per layer, and foam 28d is preferably about 0.95 centimeters to 1.0 centimeters (0.375 to 0.4 inches) thick per layer. Foam gasket 28e, which prevents the introduction of contaminants into container 20 during transport and storage, and foam 28f may be securely attached to cover 34 with, for instance, a spot application of high tack adhesive. It is preferable for foam 28e and 28f to each be about 0.32 centimeters (0.125 inches) in thickness per layer. Foam gasket 28e compresses approximately fifty percent when latches 26 are drawn down and secured. It is preferable to use a high intensity crosslinked polyethylene foam 28 which is die cut to cover the inside edges of base 32 and cover 34. Foam 28a is used for the bottom surface 50 of base 32, foam 28b, 28f reduces vibration to spindles 22, foam 28c reduces vibration to media holder 24, and foam 28d holds media 54 in place.

Outer shell handle means 30 is made of the same material as container 20, such as ABS. Handle means 30 is positioned for easy portage of container 20. It is advantageous to position handle sections 30a, 30b on edges 46, 48 of container 20 in order to keep the length L of container 20 vertically oriented so that the weight of media 54 is distributed to and positioned on spindle 22, thereby preventing damage to media 54. Carried in this vertical orientation, container 20 is generally protected by the body of the carrier, which further protects the media from damage caused by impact. Latches 26 are tightly securing, easy-to-use locking hasps which will lock when base 32 and cover 34 are correctly aligned. The vertical orientation of container 20 also reduces damage to media 54 since there is less likelihood that latches 26 will collide or engage with other items and unlatch.

Media 54 may be 8.9 centimeters (3.5 inches) or 13.3 centimeters (5.25 inches) in diameter, or other dimensions used in the industry. Preferably, media 54 are punched from a magnetic material. Media 54 may be used for diskettes, including floptical disks. Ribs 56 are made of the same material as container 20, such as ABS, and are formed into container 20 at the time container 20 is manufactured. Ribs 56 are used to reinforce container 20 and reduce the weight and thickness of the container.

As shown in FIG. 6, spindle 22 is securely positioned within container 20. Protruding lip 68 of hollow spindle 22 is positioned over spindle mount 52. Chamfered end 66 of spindle 22 is positioned within spindle holder cap 62 when cover 34 is aligned with base 32. Outer shell closure means or latches 26 are engaged to secure base 32 to cover 34. Foam 28a–28f aids in the positioning of spindle 22 in container 20 since spindles 22 have less freedom of movement. In addition, foam 28a–28f protects media 54 by absorbing vibrational energy transmission from spindle shaft 64 which can damage media 54. Media holder 24 is positioned over protruding lip 68 of spindle 22. In the embodiment of container 20 shown in FIGS. 1, 2, and 6, spindles 22 are vertically positioned within container 20 when container 20 is resting on a surface, such as a table. However, spindles 22 are horizontally oriented when container 20 is picked up by handle means 30, thereby negating the weight and pressure effects found in conventional media storage and transport containers. In addition, since media 54 have some freedom of movement, debris particles may be dislodged without damaging media 54.

Figure 7:
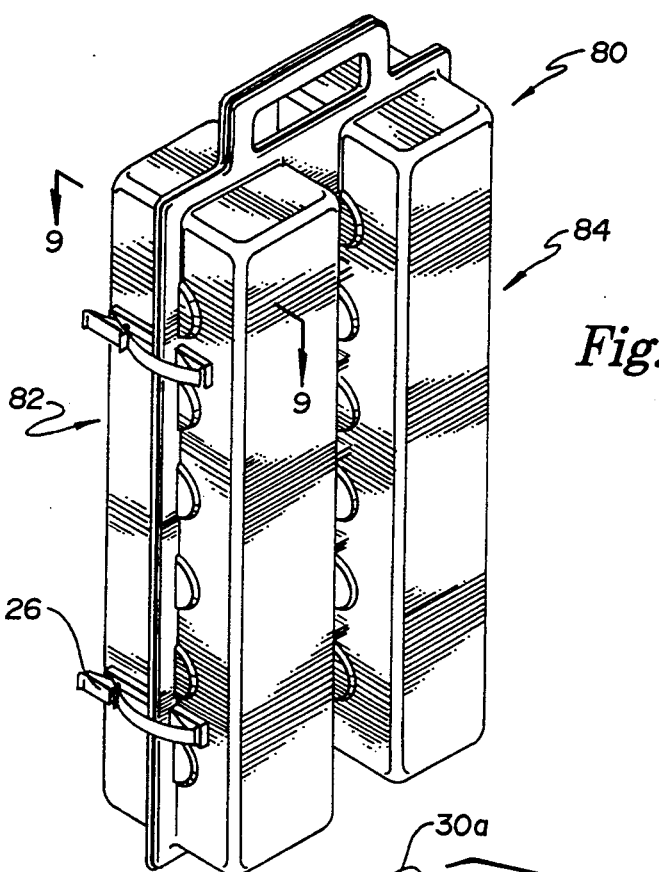
FIG. 7 is a perspective view of an alternate embodiment of the container of the invention.
Figure 9:
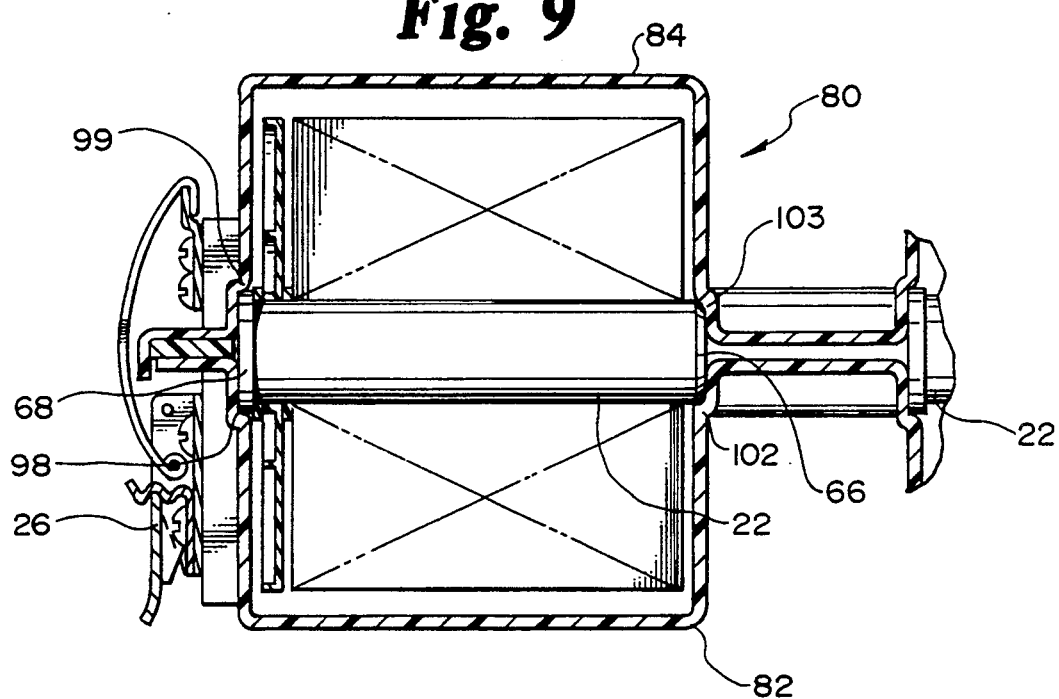
FIG. 9 is a sectional view taken along line 9—9 in FIG. 7.

An alternative embodiment of shipping container 20 is shown in FIGS. 7, 8, and 9. Outer shell or container 80 is vacuum formed from a high strength, pre-formed, durable material, such as ABS, and is sized like container 20, depending on the number of spindles 22 contained within container 80. Container 80 generally comprises base 82 and cover 84. Base 82, shown in detail in FIG. 8, generally comprises sides 86, 88, 90, 92, and bottom surface 94. Central rib 96 extends from side 90 to side 92. Sides 104, 106 are positioned on either side of central rib 96. Holder recesses 98 are positioned near the top edges 100 of sides 86, 106. Receiving recesses 102 are positioned near the upper edges 101 of sides 88, 104. Alternatively, holder recesses 98 may be positioned on sides 88, 104 and receiving recesses 102 may be positioned on sides 86, 106. Preferably, spindles 22 are positioned in the same orientation within container 80. Holder recesses 98 and receiving recesses 102 are generally semi-circular in shape, with receiving recesses 102 being slightly larger in diameter than holder recesses 98. Chamfered end 66 of spindle 22 rests in receiving recess 102. Protruding lip 68 of spindle 22 is positioned within holder recess 98. As can be seen from FIG. 8, base 82 may contain twelve spindles 22. However, container 80 may contain more or less spindles 22, depending on the diameter of media 54 used. Spindles 22 are in a horizontal orientation when placed into container 80 after media 54 are placed onto the spindle 22. A cushioning ring 49 may be positioned between media 54 and container 80, as shown in FIG. 8. In addition, spindles 22 remain in a horizontal plane or orientation when container 80 is closed and picked up by handle means 30 for carrying and transport. Media 54 are not subjected to adverse pressure or weight factors from other media 54 when oriented in such a horizontal plane.

Cover 84 of container 80 is essentially a mirror image of base 82, generally including side 86a, 88a, 90a, 92a and central rib 96a. Holder recesses 99 are positioned near the top edge 100a of sides 86a, 106a, and receiving recesses 103 are positioned near the top edges 101a on sides 88a, 104a. Holder recesses 99 and receiving recesses 103, shown in FIG. 9, are semi-circular in shape and are essentially mirror images of holder recesses 98 and receiving recesses 102.

Referring to FIG. 9, container 80 comprises cover 84 positioned over base 82. Holder recesses 98 are aligned with holder recesses 99, and receiving recesses 102 are aligned with receiving recesses 103. Holder recesses 98, 99, and receiving recesses 102, 103 completely surround chamfered end 66 and protruding lip 68 of spindle 22 when base 82 and cover 84 are joined together. Latches 26 securely fasten base 82 to cover 84. It is preferable to use locking hasp latches 26.

Figure 10:
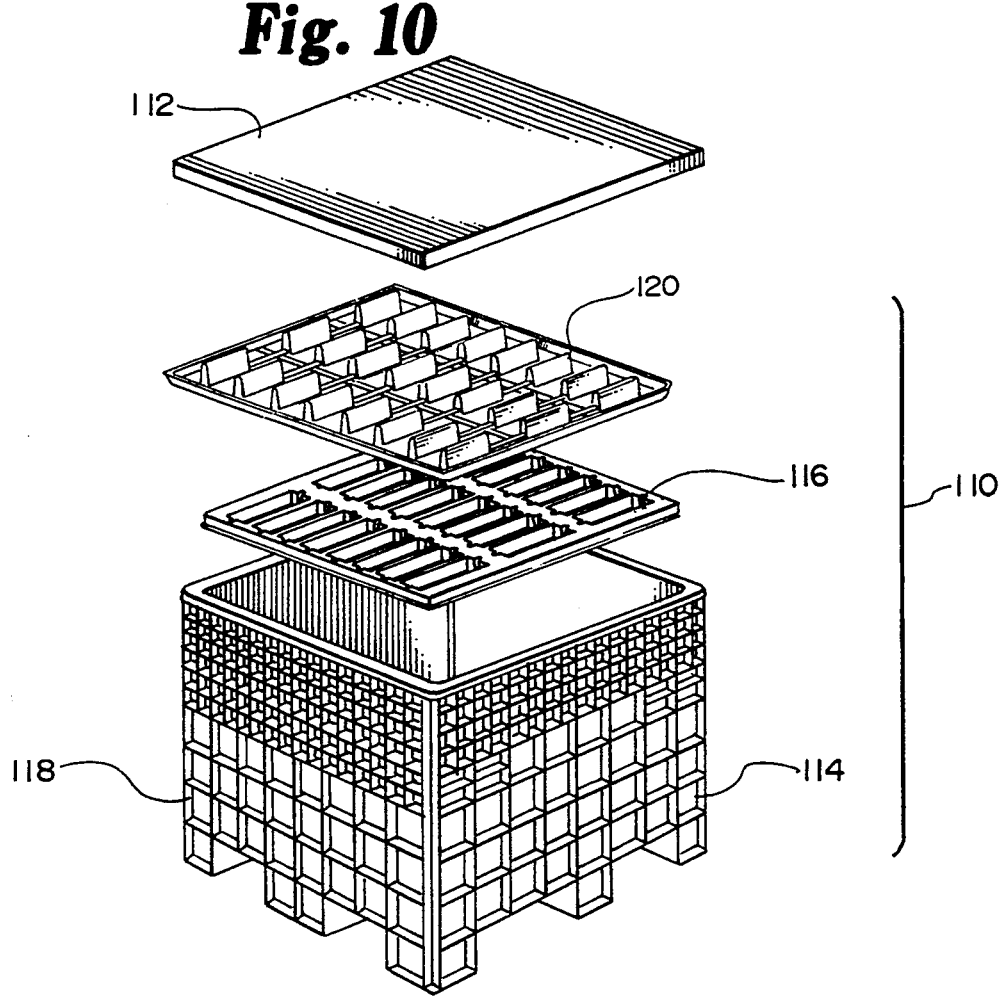
FIG. 10 is a perspective view of a pallet container used in shipping a plurality of shipping containers.
Figure 11:
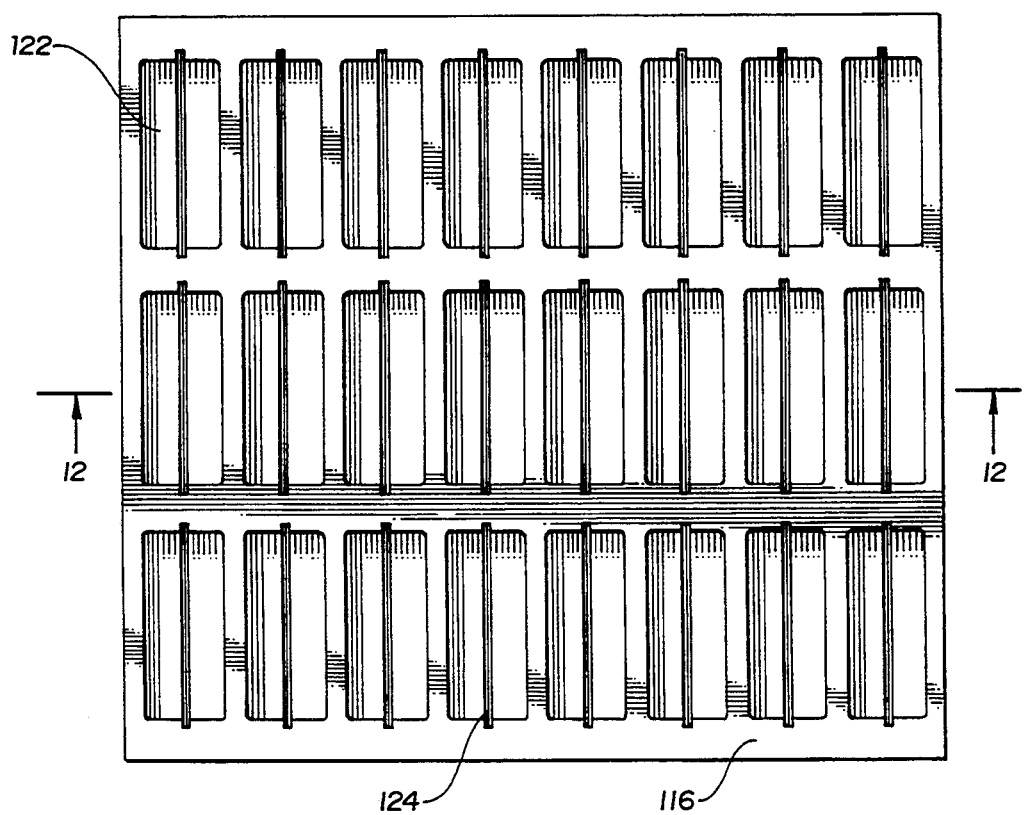
FIG. 11 is a top plan view of the bottom divider positioned in the pallet container shown in FIG. 10.
Figure 12:
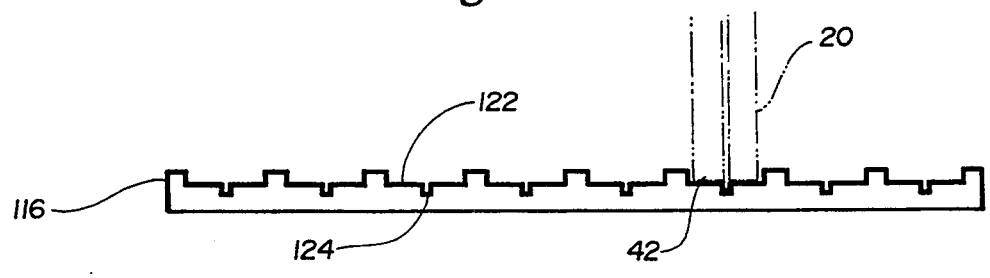
FIG. 12 is a side view of an upper section of the bottom divider shown in FIG. 11.

FIGS. 10-12 illustrates a pallet 110 used to ship containers 20, 80. Pallet 110 includes cover 112, container 114, bottom divider 116 at the base 118 of container 114 and handle holder cover 120. The inside dimensions of pallet 110 may vary depending on the number of containers 20, 80 pallet 110 will contain, but pallet 110 may be approximately 113 centimeters (44.5 inches) in length by 100 centimeters (39.5 inches) in width. Side 42 of container 20 or side 92 of container 80 are positioned in bottom divider 116, and handle means 30 is positioned within handle holder cover 120. Cover 112 is positioned over handle holder cover 120 so that cover 112 and container 114 form an integral secure unit for shipping and transport. Divider 116 and handle holder 120 firmly retain and position shipping assembly 18 within pallet 110 during transport so that spindles 22 holding media 54 are positioned in a horizontal orientation.

Referring to FIGS. 11 and 12, bottom divider 116 may position twenty-four containers 20, 80 within pallet 110. Ends 42, 42a, 92, 92a of containers 20, 80 are positioned within recesses 122 so that the edges of containers 20, 80 fit within groove 124. Handle sections 30a, 30b extend toward handle holder cover 120 for placement within handle holder cover 120. Recesses 122 are configured to receive containers 20, 80 of varying shapes.

In operation, the disk media 54 are punched from a roll of magnetic media, and are positioned on a conveyor mechanism. The media 54 then proceed to a location where they are automatically placed on spindles 22, without any manual handing of media 54. A punch press indexes the media so that each spindle 22 contains approximately one thousand of the aligned media 54. Spindles 22 containing one thousand media 54 are then removed and placed into either container 20 or container 80 under clean room conditions. Alternatively, spindles 22 may be positioned within container 20 before spindles 22 receive media 54 in an automated process, so that no manual contact is required with spindles 22. Covers 34, 84 are positioned over bases 32, 82, latches 26 are drawn down and engaged, and secure, light weight shipping containers 20, 80 result. Media 54 contained within shipping containers 20, 80 are kept free of debris and contamination and are protected from damage during handling and transport since all activities are conducted under clean room conditions. Foam gasket 28e in container 20, which is compressed when latches 26 are engaged, provides additional safeguards to keep media 54 free of contamination.

A plurality of shipping assemblies 18 are positioned within pallet 110 and the pallet is then shipped to the next site for further processing of media 54. Shipping assembly 18 weighs a maximum of about 11.4 kilograms (twenty-five pounds) when all twelve spindles 22 contain one thousand positioned media 54. As a result, shipping assembly 18 may be easily lifted by handle means 30, placed into pallet 110 for shipping, and then removed from the pallet at the next processing site by workers having varying strength and lifting capabilities.

At the next processing site, spindles 22 may be removed manually or robotically under clean room conditions. A feed and sensing mechanism is then used to individually remove, or pick and place, media 54 from spindles 22. Empty spindles 22 are re-positioned and held firmly in place within containers 20, 80. Containers 20, 80 are then shipped back to an original processing site for cleaning and re-use. Optionally, a cushioning material, such as a spring or other similar device may be inserted to prevent media holder 24 from moving during shipment of empty containers 20, 80.

Containers 20, 80 prevent damage to media 54 during loading, shipping, storage, or unloading of spindles 22 in a number of ways. First, media containers 20, 80 may only be picked up and shipped in an orientation that has the media 54 resting on spindle 22. Media 54 will virtually never be resting on another adjacent disk media 54. Media 54 will also preferably experience only a slight pressure contact, if at all, from other media 54 since media 54 are positioned in a horizontal orientation during shipping. Thus, the pressure of the disks against each other is reduced. Use of handle means 30 when carrying or transporting containers 20, 80 also ensures that spindles 22 will always be in a horizontal orientation. This significantly reduces the risk of damage to media 54 by debris or other contaminants since the media are not on top of each other or pressed together.

In this arrangement, there is less likelihood that neighboring media 54 will be damaged by the dimpling effect caused by debris positioned between media 54, or by the blocking phenomena caused by the attraction between diskette media 54, resulting in media 54 sticking to one another. Reducing the compressed packing of media 54 to a non-compressed packing in the embodiments of this invention also increases the effective yield of media 54 since particles fall out and are not retained between media 54. In addition, since less media are damaged and then rejected by shipping media 54 in a horizontal orientation, it is not necessary to ship as many media 54 as is done conventionally. Fewer media 54 are damaged and defective, and therefore, there is less waste.

As can be seen, media 54 are highly susceptible to damage by manual handling, pressure, weight of other media, and by dimpling and blocking effects. Defective or damaged media must be rejected, which is wasteful. A shipping assembly 18 which reduces the pressure between the media and eliminates the transmittance of defects from one piece of media to another is of significant value to the industry. A spindle system which eliminates media movement by reducing the vibrational energy that reaches the media is also advantageous. In addition, it is of benefit to have a system for easy placement or alignment of the media 54 on spindles 22 so that the handling of media 54 is reduced. Shipping containers 20, 80 which protect the media from contamination, pressure, weight from neighboring media, and manual handling and vibrational movement is advantageous. It is also preferable to have such a shipping assembly 18 and containers 20, 80 which are light enough for the average worker to easily lift, pack for shipment, and remove from shipping pallets even when containers 20, 80 contain the maximum number of media 54.

Media 30 will require less handling, so media 54 will not be subjected to pressure when, for instance, media 54 are being mounted on spindles 22 or removed from shipping containers. Utilizing containers 20, 80 as an integral part of the media processing, beginning with the first step of the process, has labor and packaging cost advantages. As an example, the amount of manual labor required is reduced, and containers 20, 80 are used throughout the process, rather than numerous intermediate transitory containers which are later discarded.

Containers 20, 80 are also environmentally advantageous. Containers 20, 80 are entirely reusable, as opposed to conventional cardboard shipping containers which are generally disposed of after each use, and canisters which are disposed of after only a few uses. Since it is possible to use containers 20, 80 numerous times to transport media 54 from processing site to processing site, no packaging waste is generated. Less media 54 waste is generated since containers 20, 80 significantly protect media 54 from damage. Containers 20, 80 made from a material such as ABS have the further environmental advantage of being recycled and ground down when containers 20, 80 are worn. The ground down ABS material may then be re-formed into a container for re-use as a shipping container. As a result, less waste is generated. In addition, latches 26 may be drilled out of worn containers 20, 80 and used in the newly formed shipping containers.

We claim:

1. A container for holding and transporting punched diskette media to prevent damage to the media, comprising:
    a) an outer shell formed of durable preformed material, the outer shell having a first inner side surface and a second inner side surface, the first and the second inner side surfaces each having a first and a second recessed structure suitable for receiving a hollow spindle therein;
    b) spindle mounting means for carrying a plurality of punched diskette media, the spindle mounting means comprising an elongate spindle with a first hollowed end for placement on the outer shell first recessed structure and a second chamfered end suitable for placement within the outer shell second recessed structure, the spindle mounting means having a media holder suitable for retaining media placed on the spindle;
    c) outer shell closure means for securely closing the container; and
    d) outer shell handle means for carrying the container in a position which always places the spindle in a horizontal orientation so that the weight of the media is on the spindle during carrying to reduce the pressure on other media and increase the effective yield of the media.

2. The container of claim 1 in which the outer shell is vacuum formed.

3. The container of claim 2 in which the spindle is manufactured from a light weight plastic.

4. The container of claim 1 in which the spindle circumferential protruding lip around the first hollowed end.

5. The container of claim 4 in which the media comprises a transparent polycarbonate media holder suitable for placement on the spindle circumferential protruding lip.

6. A container for holding and transporting punched diskette media to prevent damage to the media, comprising:
    (a) an outer shell formed of durable preformed material, the outer shell having a first inner side surface, having a plurality of protruding male structures suitable for receiving a plurality of hollow spindles thereon, and a second inner side surface having a plurality of recessed female structures suitable for receiving the spindles therein;
    (b) a plurality of spindle mounting means for carrying a plurality of punched diskette media, the plurality of spindle mounting means comprising a plurality of elongate spindles having a first hollowed end for placement on the outer shell protruding male structure and a second end suitable for placement within the outer shell recessed female structure, the plurality of spindle mounting means having media holders suitable for supporting media placed on the spindles;
    (c) outer shell closure means for securely closing the container; and
    (d) outer shell handle means for carrying the container in a position which always places the spindles in a horizontal plane so that during carrying the weight of the media is on the spindles rather than on other media.

7. A container for holding and transporting punched diskette media to prevent damage to the media, comprising:
    (a) an outer shell formed of durable preformed material, the outer shell having a first inner side surface having a first plurality of recessed structures for receiving a plurality of hollow spindles therein, and a second inner side surface having a second plurality of recessed structures suitable for receiving said plurality of hollow spindles therein;
    (b) a plurality of spindle mounting means for carrying a plurality of punched diskette media, the plurality of spindle mounting means comprising a plurality of elongate spindles having a first hollowed end for placement on the outer shell first recessed structure and a second chamfered end suitable for placement within the outer shell second recessed structure, the plurality of spindle mounting means having a plurality of media holders suitable for retaining media placed on the spindles;
    (c) outer shell closure means for securely closing the container; and
    (d) outer shell handle means for carrying the container in a position which always places the spindles in a horizontal orientation so that the weight of the media is on the spindles during carrying to reduce the pressure on other media and increase the effective yield of the media.

8. A container for holding and transporting annular ring shaped sensitive material to prevent damage to the material, comprising:
   (a) an outer shell formed of durable preformed material, the outer shell having a first inner side surface having a plurality of protruding male structures suitable for receiving a plurality of hollow spindles thereon, and a second inner side surface having a plurality of recessed female structures suitable for receiving the spindles therein;
   (b) a plurality of spindle mounting means for carrying a plurality of ring shaped sensitive material, the spindle mounting means comprising a plurality of elongate spindles having a first hollowed end for placement on the outer shell protruding male structure and a second end suitable for placement within the outer shell recessed female structure, and the plurality of spindle mounting means having a plurality of holders suitable for supporting the ring shaped material placed on the spindles;
   (c) outer shell closure means for securely closing the container; and
   (d) outer shell handle means for carrying the container in a position which always places the spindles in a horizontal plane so that during carrying the weight of the sensitive material is on the spindles rather than on the sensitive material.

* * * * *

UNITED STATES PATENT AND TRADEMARK OFFICE
CERTIFICATE OF CORRECTION

PATENT NO. : 5,346,065
DATED : September 13, 1994
INVENTOR(S) : Dunbar et al.

It is certified that error appears in the above-indentified patent and that said Letters Patent is hereby corrected as shown below:

Column 1, line 19, "corner of" should read --come off--.
Column 10, line 7, after "spindle" add --has a--.
Column 10, line 10, after "media" add --holder--.

Signed and Sealed this

Twentieth Day of December, 1994

Attest:

BRUCE LEHMAN

Attesting Officer           Commissioner of Patents and Trademarks